United States Patent
Vezzosi

(10) Patent No.: US 8,794,484 B2
(45) Date of Patent: Aug. 5, 2014

(54) ACTUATORS PRINCIPALLY FOR INFLATABLE SYSTEMS

(75) Inventor: Jonathan Vezzosi, Toms River, NJ (US)

(73) Assignee: Air Cruisers Company, Wall Township, NJ (US)

( * ) Notice: Subject to any disclaimer, the term of this patent is extended or adjusted under 35 U.S.C. 154(b) by 734 days.

(21) Appl. No.: 12/831,364

(22) Filed: Jul. 7, 2010

(65) Prior Publication Data

US 2011/0006157 A1    Jan. 13, 2011

Related U.S. Application Data

(60) Provisional application No. 61/270,303, filed on Jul. 7, 2009.

(51) Int. Cl.
*B67D 7/00*    (2010.01)

(52) U.S. Cl.
USPC ............... 222/5; 222/6; 222/85; 441/94

(58) Field of Classification Search
USPC ............ 222/3, 5, 6, 81, 80, 85, 399; 141/19, 141/329, 330; 441/93, 94, 9, 30; 116/210, 116/DIG. 8, DIG. 9; 30/412, 415, 446, 447; 137/68.3; 244/107; 220/277, 278
See application file for complete search history.

(56) References Cited

U.S. PATENT DOCUMENTS

| | | | | |
|---|---|---|---|---|
| 917,268 A * | 4/1909 | Early | ............................. | 220/278 |
| 1,473,306 A * | 11/1923 | McGrath | ......................... | 30/431 |
| 2,190,275 A * | 2/1940 | Simunich | ......................... | 30/446 |
| 2,598,314 A * | 5/1952 | Lotthammer et al. | .......... | 30/447 |
| 2,718,054 A * | 9/1955 | Korda et al. | ..................... | 30/448 |
| 3,014,619 A * | 12/1961 | Moran | .............................. | 222/5 |
| 3,023,932 A * | 3/1962 | Hennis et al. | ..................... | 222/5 |
| 3,113,327 A * | 12/1963 | Cook | ............................... | 441/94 |
| 3,147,885 A * | 9/1964 | Sheridan | ........................... | 222/5 |
| 3,161,322 A * | 12/1964 | Stone | ............................... | 222/5 |
| 3,591,877 A * | 7/1971 | Schuler | .............................. | 441/94 |
| 3,630,413 A * | 12/1971 | Beckes et al. | ..................... | 222/5 |
| 4,500,014 A * | 2/1985 | Zimmerly | .......................... | 222/5 |
| 5,022,879 A * | 6/1991 | DiForte | ............................. | 441/113 |
| 5,732,752 A * | 3/1998 | Glessner et al. | ............. | 141/329 |
| 6,709,019 B2 | 3/2004 | Parrott et al. | | |
| 7,114,041 B2 * | 9/2006 | Hammitt et al. | ............. | 711/149 |
| 7,207,522 B2 | 4/2007 | Parrott et al. | | |
| 7,314,398 B2 | 1/2008 | Parrott et al. | | |
| 7,419,010 B2 * | 9/2008 | Yoshida | .......................... | 169/77 |

* cited by examiner

*Primary Examiner* — Daniel R Shearer
(74) *Attorney, Agent, or Firm* — Kilpatrick Townsend & Stockton LLP; Dean W. Russell, Esq.

(57) ABSTRACT

Actuators, principally for inflating emergency-usage objects such as floats and rafts, are detailed. Two opposite positive actions may be required to effect complete inflation of the objects, inhibiting inadvertent deployment of, particularly, the rafts while readily permitting deployment when intended.

9 Claims, 8 Drawing Sheets too overcome the strength of the wire, the handle remains seated in the base, preventing actuation of inflation.

Although these existing actuators of the assignee perform well, they may be subjected to instances in which crew (or passengers if in the cockpit) inadvertently apply sufficient force to the handles to break the wires. As an example of such an instance, should a strap from a camera or flight bag encircle a handle, the bag holder may attempt to detangle the strap by yanking on it. This yanking could apply momentary force to the handle greater than the strength of the breakaway wire, causing the wire to fail and the handle to extend, in turn actuating the inflation system for the raft. Need thus exists for actuators designed to diminish further the possibility of inadvertent activation by passengers or crew.

ACTUATORS PRINCIPALLY FOR INFLATABLE SYSTEMS

REFERENCE TO PROVISIONAL APPLICATION

This application is based on, claims priority to, and hereby refers to U.S. Provisional Patent Application Ser. No. 61/270,303, filed Jul. 7, 2009, the entire contents of which are incorporated herein by this reference.

FIELD OF THE INVENTION

This invention relates to actuators and more particularly, although not necessarily exclusively, to actuators commencing inflation of emergency flotation apparatus intended for use with aircraft such as helicopters.

BACKGROUND OF THE INVENTION

Many aircraft carry emergency flotation devices should they cease flying while over water. Such flotation devices may include life rafts for passengers and crew as well as floats for the aircraft itself. This is particularly true for certain helicopters flying over-water missions, which helicopters often contain both inflatable rafts and inflatable floats. Prior to deployment, the floats typically are mounted to landing skids of the helicopters, whereas the rafts normally are stowed inside the cabins.

Should a helicopter need to ditch in water, prior to ditching the pilot typically activates the inflatable floats by pulling a handle or lever mounted to a primary flight control. Actuating inflation of the life rafts may be more difficult, however. If the rafts are stowed within the aircraft cabin, their premature inflation could injure passengers or crew or interfere with crew control of the aircraft. Similarly, premature inflation of externally-stowed rafts could result in their being displaced from the aircraft or, alternatively, becoming entangled in aircraft controls. Preventing inadvertent actuation of raft inflation systems thus is of substantial importance to aircraft passengers and crew.

U.S. Pat. No. 7,314,398 to Parrott, et al. discloses certain helicopter flotation systems comprising both floats and life rafts. Indicated in the Parrott '398 patent is that "[i]nflation of the floats is achieved using . . . an actuator, such as an electrical or mechanical switch, to release a canister of compressed gas into an air hose . . . and into the floats." See Parrott '398, col. 4, 11. 19-22 (numerals omitted). Inflation of the life rafts occurs likewise. See id., 11. 41-45. No further description of the actuator—or of preventing inadvertent actuation—occurs in the Parrott '398 patent, however.

U.S. Pat. No. 7,207,522 to Parrott, et al. discusses safety trigger devices associated with inflatable life rafts. According to the Parrott '522 patent, such devices may include multiple handles, with movement of any of the handles triggering inflation of the rafts via rotation of a cam. The handles are intended to be spaced about a helicopter so that the rafts may be inflated "from a plurality of locations including the cockpit and each side o" f the helicopter. See Parrott '522 at col. 1, 11. 36-38. Again, however, no description of preventing inadvertent actuation of inflation systems is made. Moreover, offering multiple actuation handles may increase, rather than decrease, the likelihood of premature inflation of the rafts.

An existing pneumatic actuator of the assignee of this application includes a cockpit-located handle as well as a shear, or "breakaway," wire. Connected between the handle and the base, the breakaway wire inhibits certain inadvertent inflation actions. Until sufficient force is applied to the handle

SUMMARY OF THE INVENTION

The present invention provides such actuators. Preferred versions of the invention require two opposite actions to complete the inflation process, a pulling activity designed to inflate the floats and a pushing motion to inflate the rafts. Collectively, these actions inhibit inadvertent deployment of the actuators (especially as to the rafts) while readily permitting deployment when actually intended.

A crewmember (or passenger) pulls a handle or other lever to commence the activation process. This motion actuates float inflation by piercing a first canister of inflating fluid. It also results in movement of a spring-loaded detent so as to align a bearing surface with a second piercing mechanism. Subsequent pushing of the lever causes the bearing surface to contact and move the second piercing mechanism, in turn puncturing a second canister and inflating the rafts. A roll pin or other arresting device may limit rotation of the lever when initially pulled.

It thus is an optional, non-exclusive object of the present invention to provide actuators requiring multiple actions for complete activation.

It is another optional, non-exclusive object of the present invention to provide actuators requiring opposite actions (e.g., pulling and pushing) for complete activation.

It is a further optional, non-exclusive object of the present invention to provide actuators useful especially, although not exclusively, on-board aircraft.

It is also an optional, non-exclusive object of the present invention to provide actuators useful in connection with inflating life rafts mounted in, on, or to helicopters.

It is an additional optional, non-exclusive object of the present invention to provide actuators in which a person must cause float inflation prior to inflation of the rafts occurring.

Other objects, features, and advantages of the present invention will be apparent to those skilled in the appropriate fields with reference to the remaining text and the drawings of this application.

DETAILED DESCRIPTION

Figure 1:
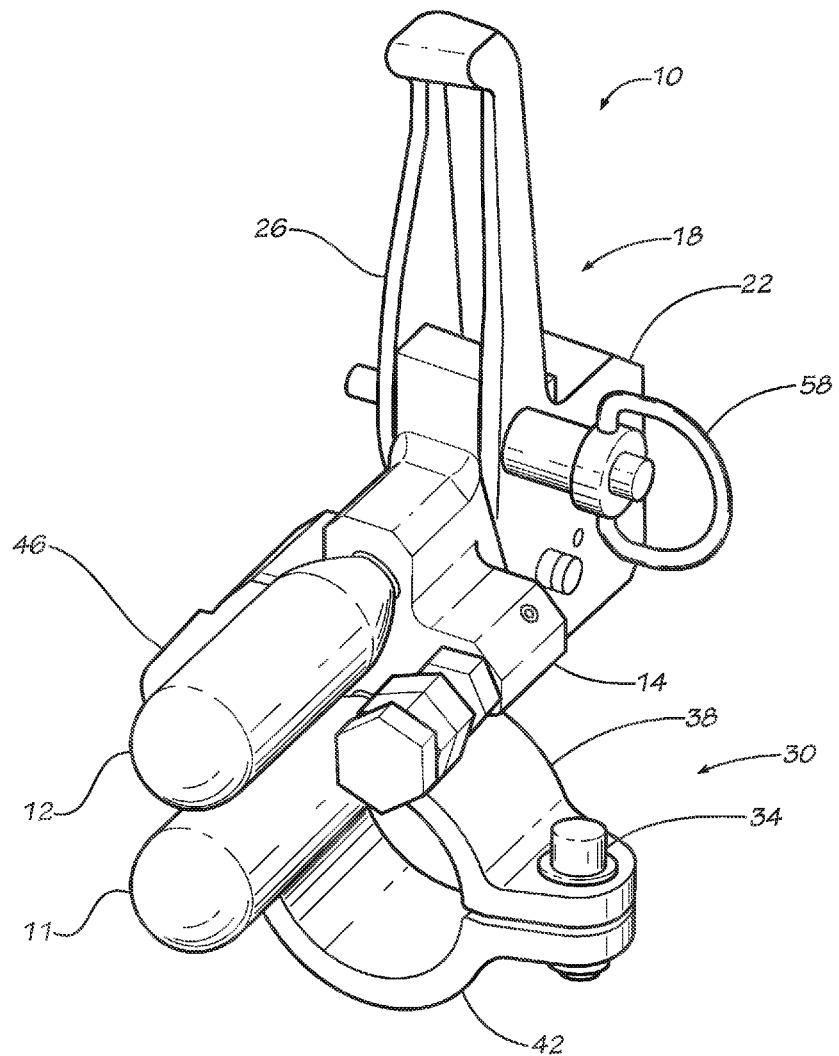
FIG. 1 is a perspective view of an exemplary actuator of the present invention.

Illustrated in FIGS. 1-8 is exemplary actuator 10 of the present invention. Also depicted in the figures are first and second cartridges 11 and 12, which may contain compressed gas. Such gas preferably will be used to inflate emergency equipment such as floats and life rafts, although it conceivably may be used for other purposes instead. Alternatively, either or both of cartridges 11 and 12 may be part of a pyrotechnic mechanism for generating inflation gas. Preferably, however, carbon dioxide is contained within cartridges 11 and 12.

Actuator 10 may include body 14 to which lever or handle structure 18 may be connected. Handle structure 18 preferably includes base 22 and handle 26, the latter of which beneficially is (but need not necessarily be) an elongated object configured to be grasped by a human hand. Base 22 extends from handle 26 to facilitate connecting handle structure 18 to body 14.

Figure 2:
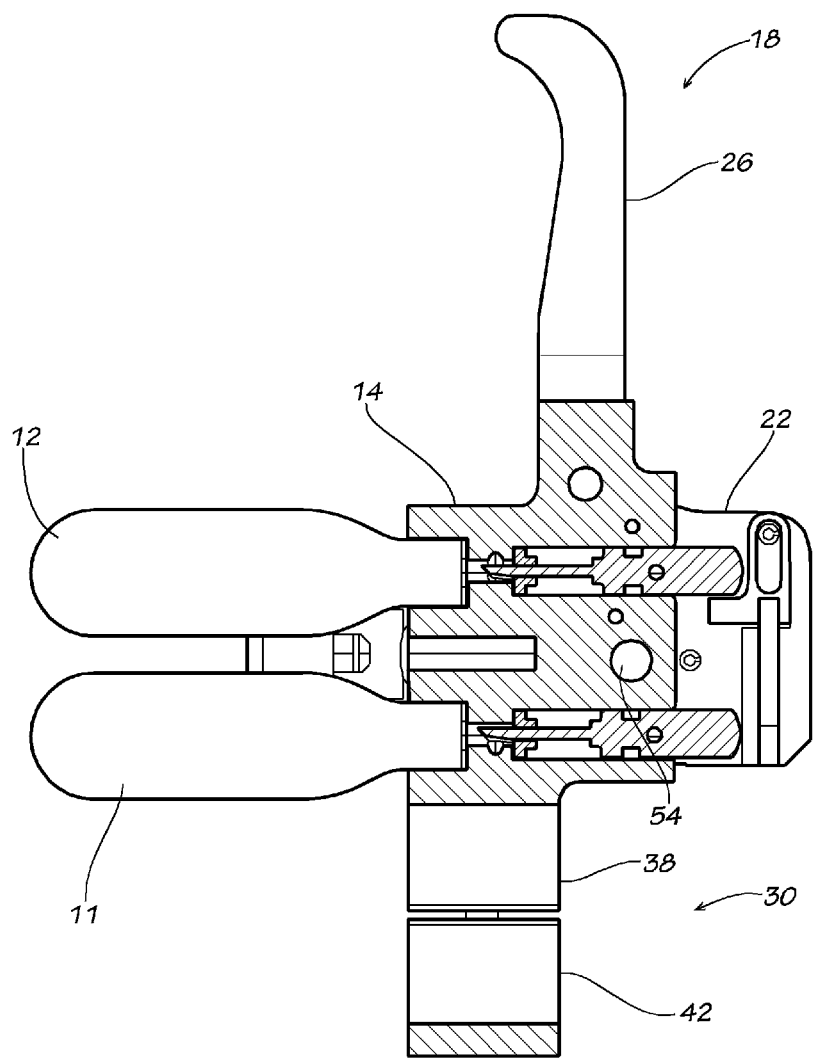
FIGS. 2-3 are partially cut-away views of the actuator of FIG. 1 in an initial position.

Body 14 additionally may include means for mounting actuator 10 within an aircraft cockpit (or otherwise as desired). Depicted in FIGS. 1-2 is an example of such a mounting means comprising split collar 30 and fasteners 34. In this example, upper portion 38 of collar 30 may be fitted about the outer surface of a cylindrical object; lower portion 42 of collar 30 may too be fitted about the outer surface, following which the upper and lower portions 38 and 42 may be connected using fasteners 34. Body 14 may include at least one, and preferably two, exhaust ports 46 and 50 (see also FIG. 8) and internal channels sufficient to allow fluid communication between cartridge 11 and port 50 and between cartridge 12 and port 46. Those skilled in relevant fields will, of course, recognize that fluid communication may occur differently than as depicted in FIGS. 1-8.

Pin 54 connects body 14 and base 22 of handle structure 18. Handle structure 18 may pivot about the longitudinal axis of pin 54, allowing handle 18 to be both pulled and pushed. Removable arming pin 58 also may (initially) connect body 14 to handle structure 18, preventing structure 18 from pivoting until the pin 58 is removed.

Illustrated as present within at least one of body 14 and base 22 are first and second piercing mechanisms 62 and 66, respectively, roll pin 70, and detent assembly 74. First piercing mechanism 62 includes first pin 78 configured to pierce, puncture, or otherwise encroach upon first cartridge 11 so as to release compressed inflation fluid therefrom. Similarly, second piercing mechanism includes second pin 82 configured to release compressed inflation fluid from second cartridge 12. First and second piercing mechanisms 62 and 66 may travel within respective bores or channels 86 and 90 within body 14 between a first position (in which a respective pin is remote from a cartridge; see, e.g., FIG. 3) and a second position (in which a respective pin engages a cartridge; see, e.g., FIGS. 4-8).

Roll pin 70 may be utilized to restrict rotation of handle structure 18. Such restriction may occur in any suitable way or, if desired, not be present in actuator 10. Likewise, other conventional means for restricting rotation may be used instead.

Detent assembly 74 may comprise detent 94, plunger 98, and pin 100. Preferred detent 94 may have a generally "L" shape with slot 102 present in its upstanding leg 106. Pin 100 may be positioned within slot 102.

Detent 94 additionally may have a notch or channel into which plunger 98 may be fitted. Because plunger 98 preferably is spring-loaded, it bears against surface 102 within the channel of detent 94. Second leg 110 of detent 94 includes surfaces 114 and 118, the latter of which initially may contact second piercing mechanism 66 to counteract the biasing force of spring-loaded plunger 98.

Figure 3:
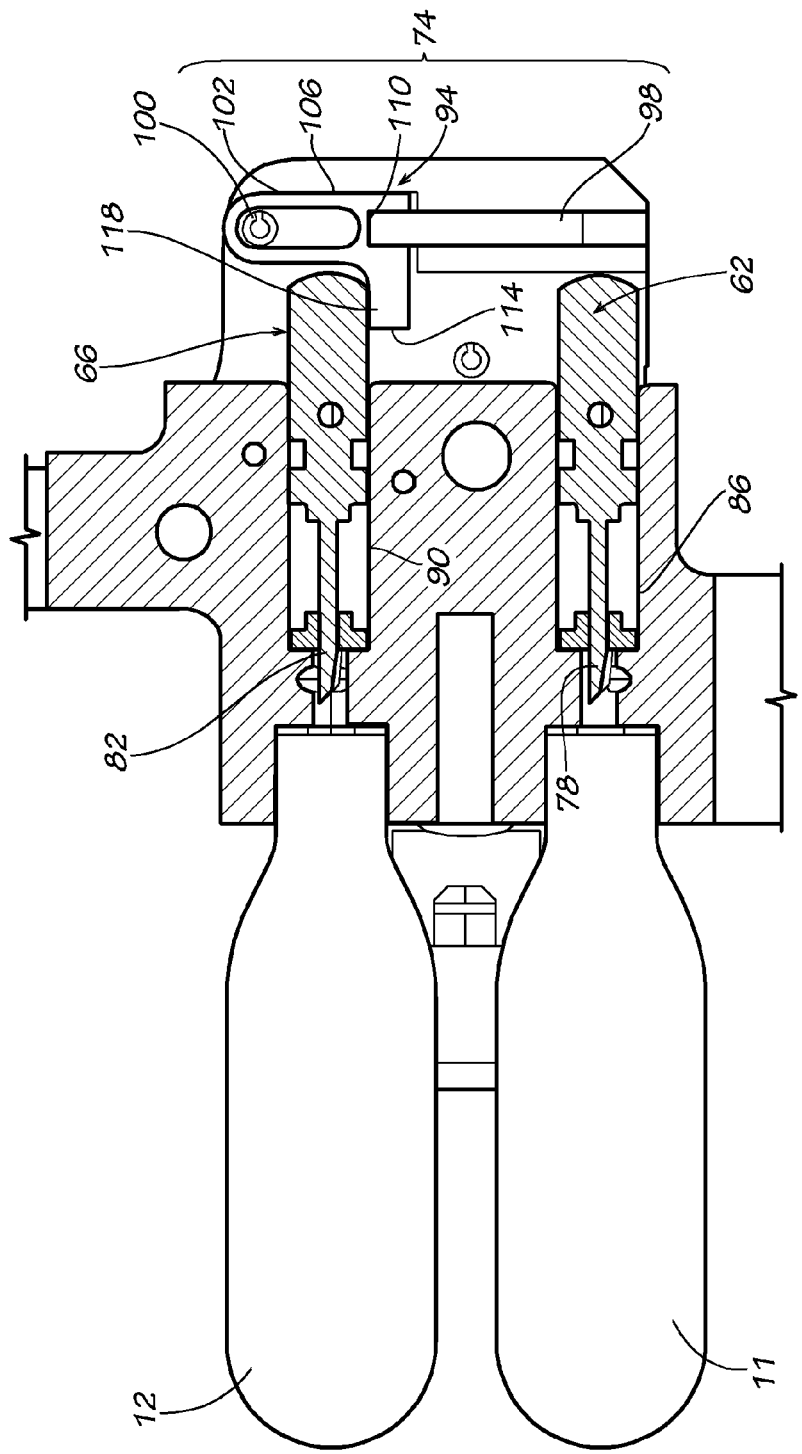

FIGS. 2-3 thus illustrate actuator 10 in its normal, unactivated state. As shown, handle structure 18 is in a neutral position, not having been rotated about pin 54. First and second cartridges 11 and 12 are intact, as pins 78 and 82 are remote therefrom.

Figure 4:
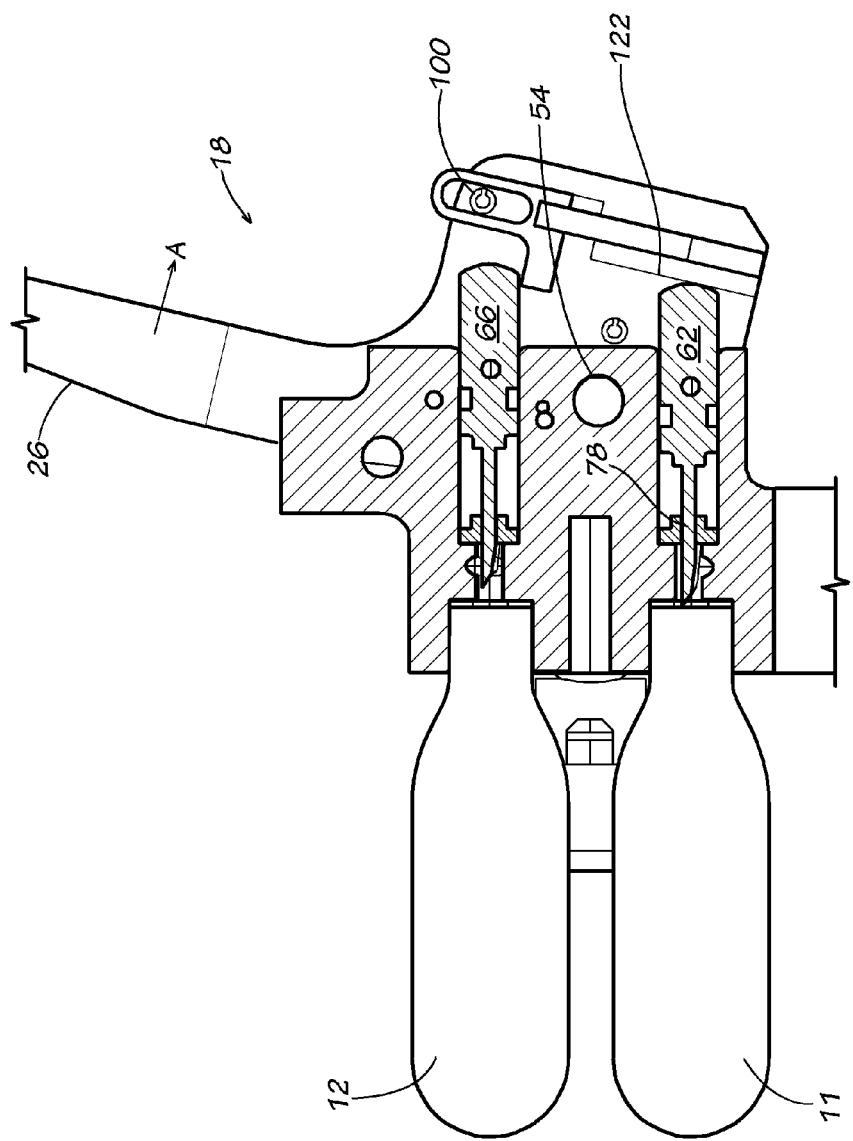
FIGS. 4-7 are partially cut-away views of the actuator of FIG. 1 in various positions allowing inflation of floats and rafts.

Should an emergency (or other reason) arise prompting use of actuator 10, a pilot (or other crewmember or person) may grasp handle 26 and move it away from cartridges 11 and 12. Because actuator 10 typically will be mounted in a cockpit and oriented with cartridges 11 and 12 remote from the pilot, the initial action of the pilot will be a pulling motion on handle 26 (see arrow "A" of FIG. 4). This initial action causes handle structure 18 to rotate about pin 54, as shown in FIG. 4. As handle structure 18 rotates, internal surface 122 bears against first piercing mechanism 62, moving pin 78 toward first cartridge 11. Eventually pin 78 breaches cartridge 11 (FIG. 5), causing the compressed inflation fluid therein to be exhausted, via port 50, to one or more inflatable objects (preferably floats).

Figure 5:
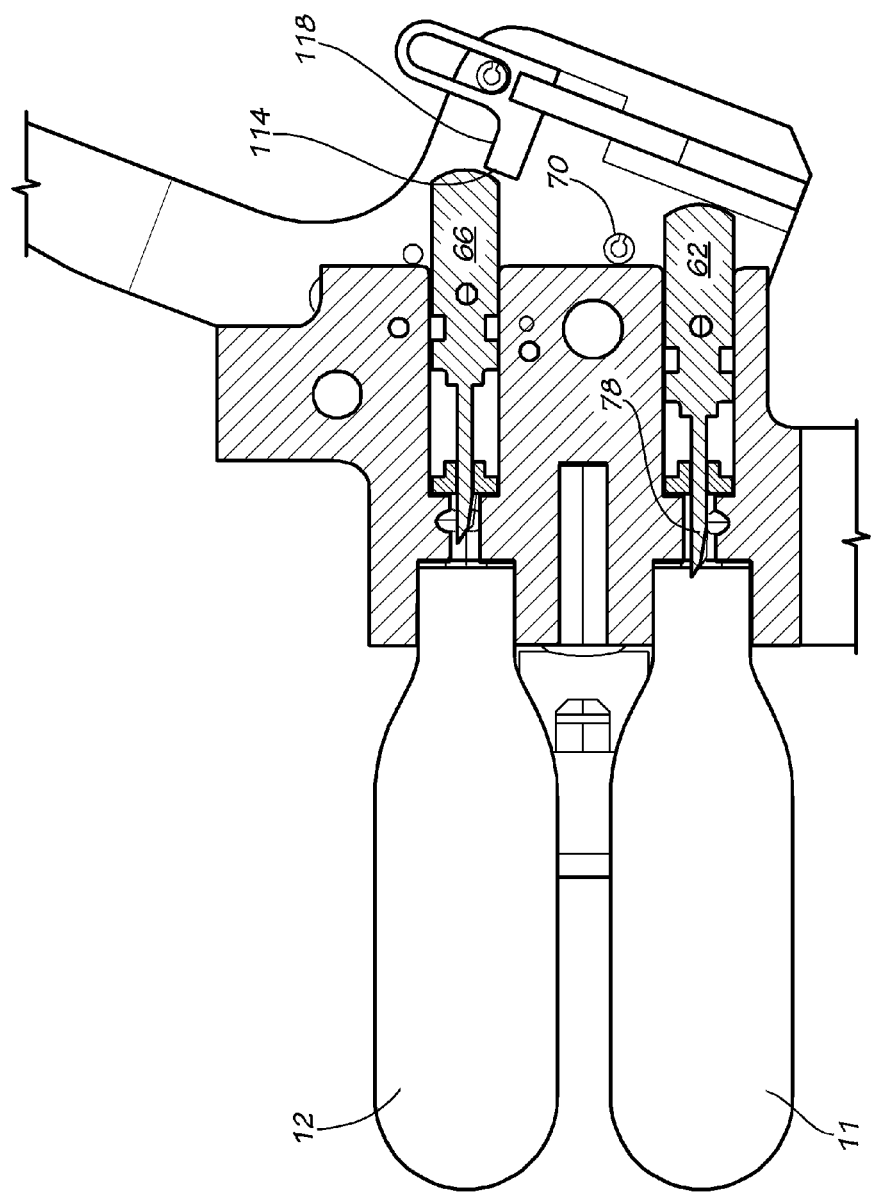

Also illustrated in FIG. 5 is movement of detent 94 as handle structure 18 pivots about pin 54. Such pivoting causes surface 118 no longer to bear against second piercing mechanism 66, allowing plunger 98 to move detent 94 until the movement is arrested by pin 100. At this point, surface 114 bears against second piercing mechanism 66.

Figure 6:
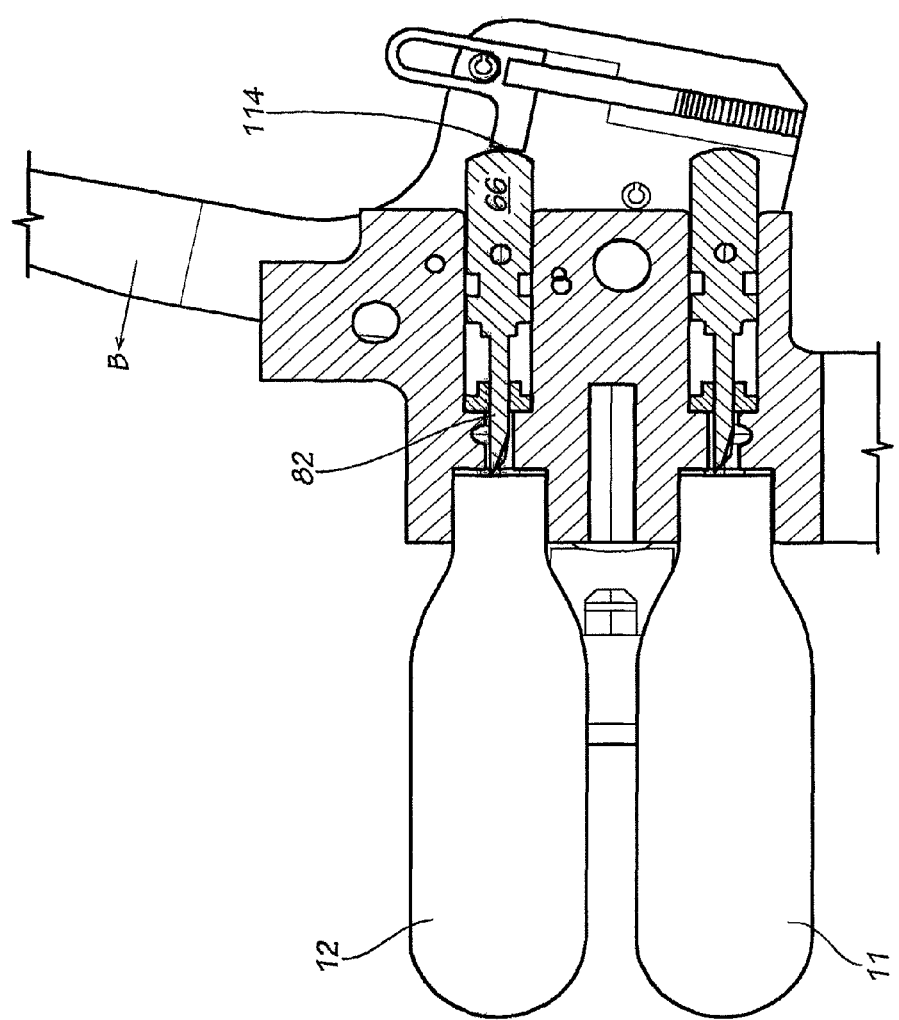
Figure 7:
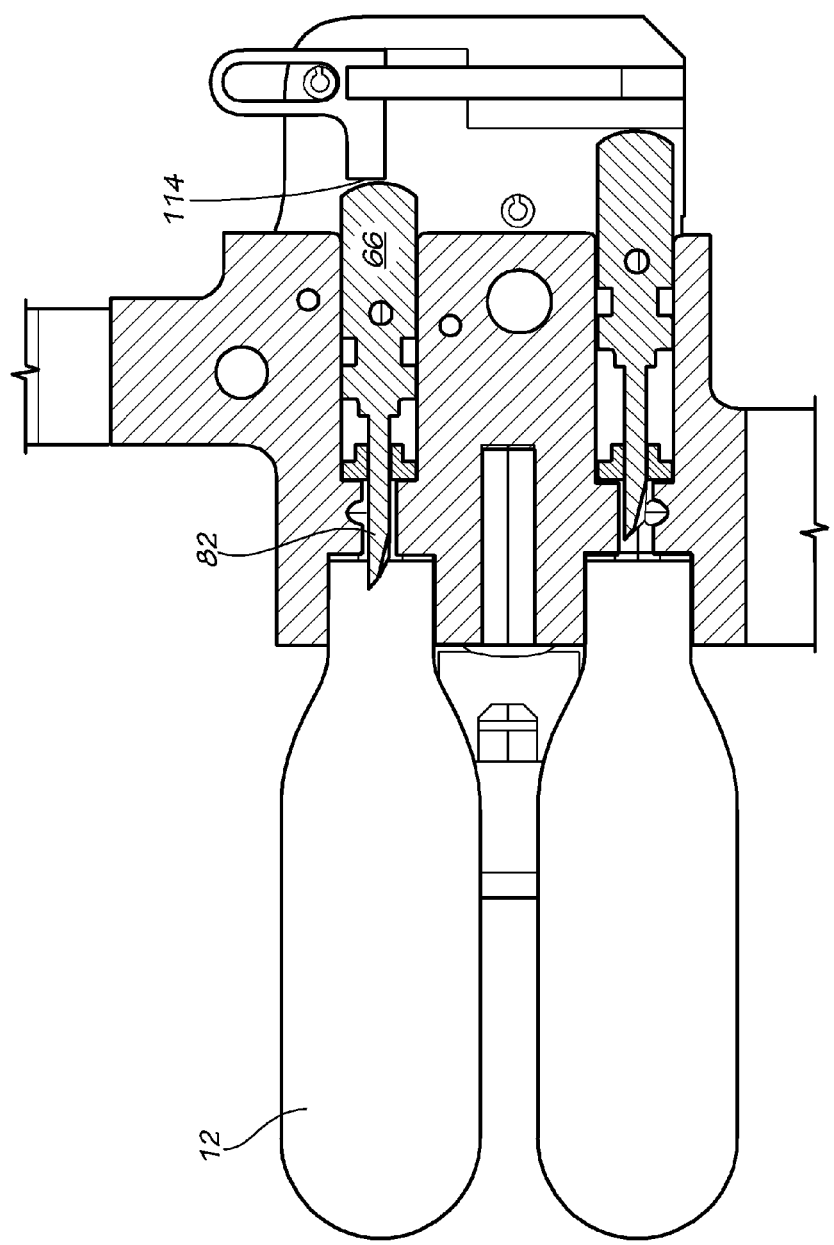
Figure 8:
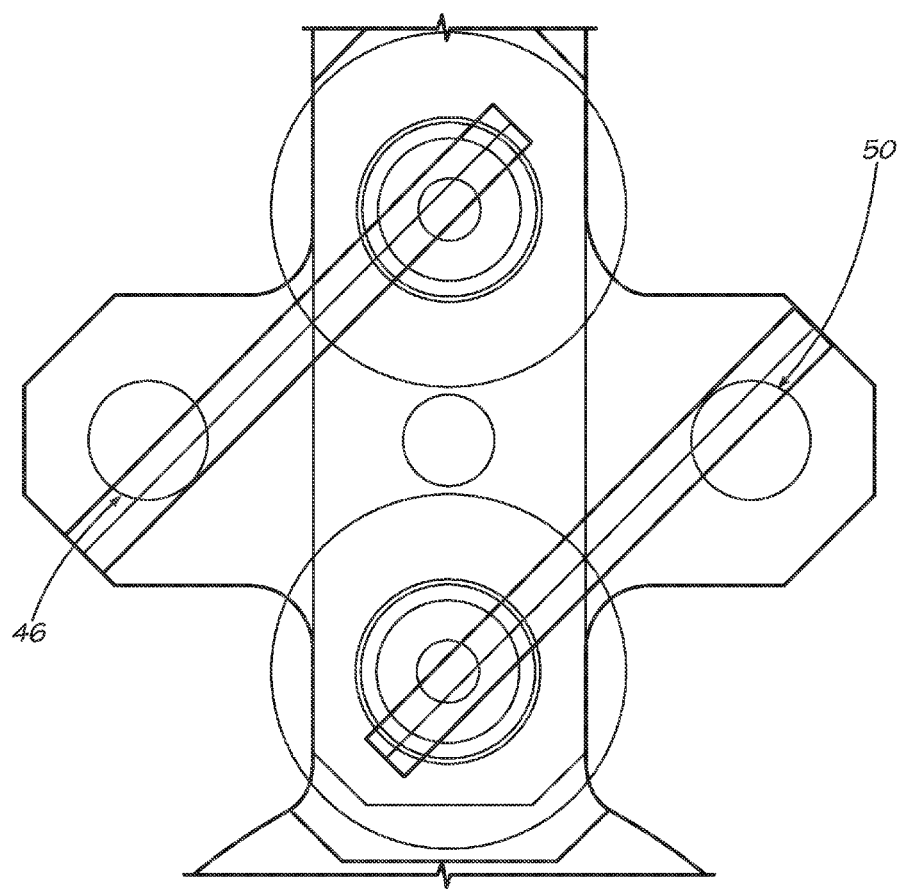
FIG. 8 is a plan view of portions of the actuator of FIG. 1.

Moving handle 26 toward cartridges 11 and 12 (see arrow "B" of FIG. 6), therefore, causes surface 114 to push second piercing mechanism 66 toward cartridge 12 as detailed in FIG. 6. Continued pushing forces pin 82 to pierce cartridge 12 (FIG. 7), causing the compressed inflation fluid therein to be exhausted through port 46 for inflation of one or more objects. These objects preferably are rafts for use by passengers or cargo of the aircraft.

The present invention thus provides a two-stage inflation sequence for inflatable objects. If on-board a helicopter intending to ditch over water, for example, handle 26 of actuator 10 initially would by pulled by a pilot prior to ditching so as to activate floats for the aircraft. As ditching occurs (or soon thereafter), the pilot may push handle 26 to activate life rafts. Thus, in this example raft inflation may not occur until after floats have been inflated, reducing the risk of premature inflation of the rafts. Further, preferred versions of actuator 10 are installed on-board helicopters so that handle 26 may not be grasped until a pilot releases the primary flight control, requiring him or her to take deliberate action to utilize actuator 10. This requirement reduces risk of inadvertent inflation of any of the inflatable objects.

The foregoing is provided for purposes of illustrating, explaining, and describing embodiments of the present invention. Modifications and adaptations to these embodiments will be apparent to those skilled in the art and may be made without departing from the scope or spirit of the invention. Additionally, the contents of the Parrott '398 patent and of the Parrott '522 patent are incorporated herein in their entireties by this reference.

What is claimed is:

1. An actuator comprising:
   a. a body;
   b. first and second piercing mechanisms. at least a portion of each of which is positioned within the body;
   c. means, directly or indirectly connected to the body, for pivoting relative to the body from a neutral position, (i) in a first direction to cause movement of the first piercing mechanism without causing movement of the second piercing mechanism and (ii) in a second direction to cause movement of the second piercing mechanism, the second direction being opposite the first direction; and d. distinct first and second sources of inflation gas and in which the first piercing mechanism is configured upon movement to pierce the first source of inflation gas and the second piercing mechanism is configured upon movement to pierce the second source of inflation gas.

2. An actuator according to claim 1 further comprising means for mounting within an aircraft cockpit.

3. An actuator according to claim 2 in which the pivoting means comprises
   a detent assembly comprising a detent and a plunger.

4. An actuator according to claim 3 in which the plunger is spring-loaded and the detent defines a notch or channel into which the plunger is fitted.

5. An actuator according to claim 4 in which the pivoting means further comprises a handle and the detent assembly has a surface that is configured to bear against the first piercing mechanism as the handle pivots in the first direction.

6. An actuator according to claim 5 in which the detent has first and second surfaces, with the first surface being adjacent the second piercing mechanism when the handle is in the neutral position.

7. An actuator according to claim 6 in which the first surface of the detent is configured to move away from the second piercing mechanism as the handle pivots in the first direction.

8. An actuator according to claim 7 in which the second surface of the detent is configured to bear against the second piercing mechanism as the handle pivots in the second direction.

9. An actuator comprising:
   a. a body;
   b. first and second piercing mechanisms, at least a portion of each of which is positioned within the body; and
   c. means, directly or indirectly connected to the body, for pivoting at least twice relative to the body from a neutral position, the first movement causing the first piercing mechanism to pierce a first object and the second movement causing the second piercing mechanism to pierce a second object, and further in which (i) the first movement does not cause the second piercing mechanism to pierce the second object and (ii) the second movement is in a direction opposite the first movement.

\* \* \* \* \*